US010461637B2

(12) United States Patent
Itoh et al.

(10) Patent No.: US 10,461,637 B2
(45) Date of Patent: Oct. 29, 2019

(54) DC-DC CONVERTER

(71) Applicants: OMRON Corporation, Kyoto (JP); NAGAOKA University of Technology, Niigata (JP)

(72) Inventors: Junichi Itoh, Nagaoka (JP); Katsutaka Tanabe, Moriyama (JP); Akihiro Funamoto, Kyoto (JP); Koji Ando, Kusatsu (JP)

(73) Assignees: OMRON Corporation, Kyoto (JP); NAGAOKA University of Technology, Niigata (JP)

( * ) Notice: Subject to any disclaimer, the term of this patent is extended or adjusted under 35 U.S.C. 154(b) by 0 days.

(21) Appl. No.: 16/133,650

(22) Filed: Sep. 17, 2018

(65) Prior Publication Data

US 2019/0149044 A1    May 16, 2019

(30) Foreign Application Priority Data

Nov. 10, 2017 (JP) .................. 2017-217769

(51) Int. Cl.
*H02M 3/07* (2006.01)
*H02M 3/158* (2006.01)
(Continued)

(52) U.S. Cl.
CPC .......... *H02M 3/073* (2013.01); *H02M 1/088* (2013.01); *H02M 3/07* (2013.01); *H02M 3/158* (2013.01);
(Continued)

(58) Field of Classification Search
CPC ............ H02M 3/15–3/158; H02M 3/07–3/073
See application file for complete search history.

(56) References Cited

U.S. PATENT DOCUMENTS

| 2013/0119961 A1* | 5/2013 | Okuda ................. H02M 3/158 323/299 |
| 2013/0134786 A1* | 5/2013 | Ishigaki ............... H02M 3/158 307/71 |

(Continued)

FOREIGN PATENT DOCUMENTS

| CN | 106787877 | 5/2017 |
| JP | 2013192383 | 9/2013 |
| WO | 2004017505 | 2/2004 |

OTHER PUBLICATIONS

Office Action of Taiwan Counterpart Application, with English translation thereof, dated Apr. 19, 2019, pp. 1-11.

*Primary Examiner* — Fred E Finch, III
*Assistant Examiner* — Rafael O. De Leon Domenech
(74) *Attorney, Agent, or Firm* — JCIPRNET (57) ABSTRACT

A switching element with a small current capacity is provided to be able to be used in a DC-DC converter. The DC-DC converter includes a switching circuit in which a first switching element, a second switching element, a third switching element, and a fourth switching element are connected in series, a flying capacitor that is connected between a connection portion between the first switching element and the second switching element and a connection portion between the third switching element and the fourth switching element, a reactor that is connected between a connection portion between the second switching element and the third switching element and a positive electrode of an input unit, and a control circuit that turns on/off the switching element, in which the control circuit turns on/off the switching elements so that a peak value in a reactor current becomes equal to or smaller than a predetermined value.

15 Claims, 11 Drawing Sheets

(51) Int. Cl.
    *H02M 1/088*      (2006.01)
    *H02M 7/44*       (2006.01)
    *H02M 1/00*       (2006.01)
(52) U.S. Cl.
    CPC ...... *H02M 7/44* (2013.01); *H02M 2001/0009* (2013.01); *H02M 2001/0048* (2013.01)

(56) References Cited

U.S. PATENT DOCUMENTS

2014/0361757 A1\* 12/2014 Sunahara ............ H02M 3/1588
                                                         323/282
2017/0019027 A1    1/2017  Knobloch \* cited by examiner

DC-DC CONVERTER

CROSS-REFERENCE TO RELATED APPLICATION

This application claims the priority benefit of Japan application serial no. 2017-217769, filed on Nov. 10, 2017. The entirety of the above-mentioned patent application is hereby incorporated by reference herein and made a part of this specification.

BACKGROUND

Technical Field

The disclosure relates to a DC-DC converter.

Description of Related Art

Figure 11:
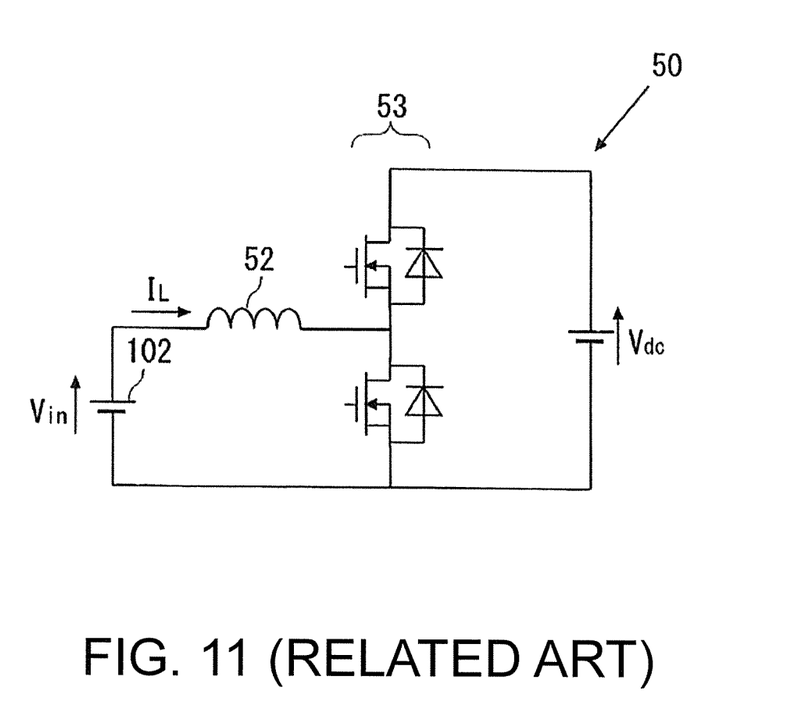
FIG. 11 is a circuit illustrating a boosting chopper circuit of the related art.

In the related art, in a power conditioner for a power generation device such as a solar power generation device, a DC voltage of the power generation device may be boosted by a DC-DC converter, converted to an AC voltage by an inverter circuit, and output. FIG. 11 illustrates a circuit diagram of a general boosting chopper type DC-DC converter 50 that can be applied to the power conditioner as described above. This DC-DC converter 50 boosts an input voltage Vin using a boosting chopper 53. Magnetic energy is stored in a reactor 52, and the magnetic energy is converted into electric energy again and emitted, thereby boosting the input voltage. In the general boosting chopper type DC-DC converter (hereinafter simply referred to as a "boosting chopper") 50 as illustrated in FIG. 11, the reactor 52 has a large influence on a device volume and cost, and therefore, a demand for miniaturization of the reactor 52 is increasing.

Here, a control scheme for a reactor current $I_L$ includes a continuous current mode (hereinafter also referred to as a CCM) and a discontinuous current mode (hereinafter also referred to as DCM). In the CCM, a part of a current waveform may have a negative value at a light load at which an average current is small, whereas the DCM is a mode in which a current waveform is a discontinuous waveform and a current does not have a negative value at the light load at which an average current is small. In the DCM mode, high efficiency can be obtained at the light load. Therefore, since high efficient driving can be performed with a smaller average current than that of the CCM by adopting the DCM, it is possible to miniaturize the reactor for boosting.

However, even when the DCM is adopted, it is difficult to greatly reduce a peak value of the current waveform even at the heavy load, and therefore, a switching element having a relatively large current capacity is necessary as the boosting chopper. Further, further miniaturization of the reactor is limited. This may hinder miniaturization and reduction in cost of the device.

PATENT DOCUMENTS

[Patent Document 1] Japanese Laid-Open No. 2013-192383

SUMMARY

The disclosure provides a technology capable of reducing a size or cost of a device by enabling a reactor or a switching element with a small current capacity to be used in a DC-DC converter.

The disclosure is a DC-DC converter that boosts a DC input voltage to obtain a DC output voltage, the DC-DC converter including: a switching circuit of which both terminals are connected to an output unit that outputs the DC output voltage and in which four switching elements are connected in series in an order of a first switching element, a second switching element, a third switching element, and a fourth switching element; a flying capacitor that is connected between a connection portion between the first switching element and the second switching element and a connection portion between the third switching element and the fourth switching element; a reactor that is connected between a connection portion between the second switching element and the third switching element and a positive electrode of an input unit to which the DC input voltage is input; and a control circuit that turns on/off each switching element in the switching circuit at a predetermined timing, wherein the control circuit turns on/off each of the switching elements so that a maximum value in a reactor current flowing through the reactor becomes equal to or smaller than a predetermined value.

Further, the disclosure may be a power conditioner including: the DC-DC converter; and an inverter circuit that converts an output of the DC-DC converter to an AC.

It should be noted that in the disclosure, means for solving the above problem can be used in combination in a possible range.

DESCRIPTION OF THE EMBODIMENTS

<Example of Application>

Figure 1:
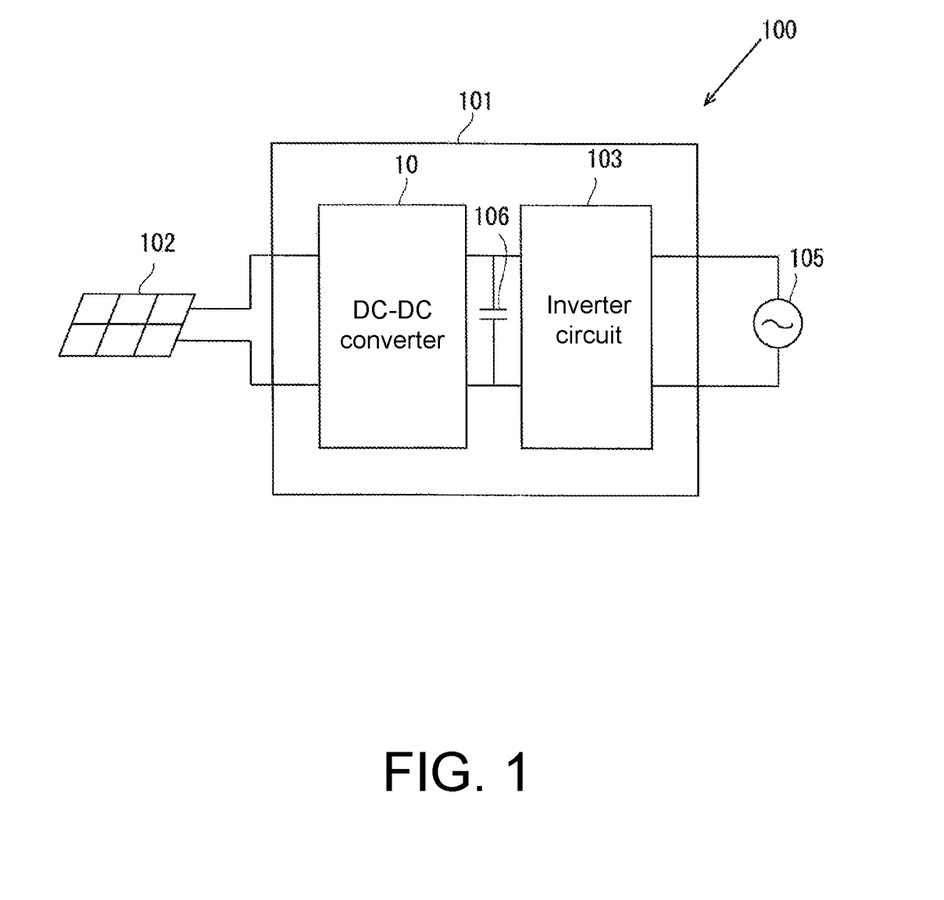
FIG. 1 is a block diagram illustrating a power generation system including a DC-DC converter according to an embodiment of the disclosure.

Hereinafter, an example of an application of the disclosure will be described with reference to the drawings. FIG. 1 illustrates a schematic configuration of a power generation system 100 including a power conditioner 101 in this example of an application. The power generation system 100 includes a power generation device 102 such as a solar cell, and a power conditioner 101 to which the power generation device 102 is connected. An output of the power conditioner 101 is connected to a power system 105 or a load (not illustrated). The power conditioner 101 converts a power output from the power generation device 102 to a power suitable for supply to the power system 105 or the load (not illustrated). It should be noted that the power conditioner 101 includes a DC-DC converter 10 to which the power is input from an output terminal of the power generation device 102, and an inverter circuit 103 that is connected to the DC-DC converter 10 via a smoothing capacitor 106 and converts a DC power output from the DC-DC converter 10 into an AC power.

Figure 2:
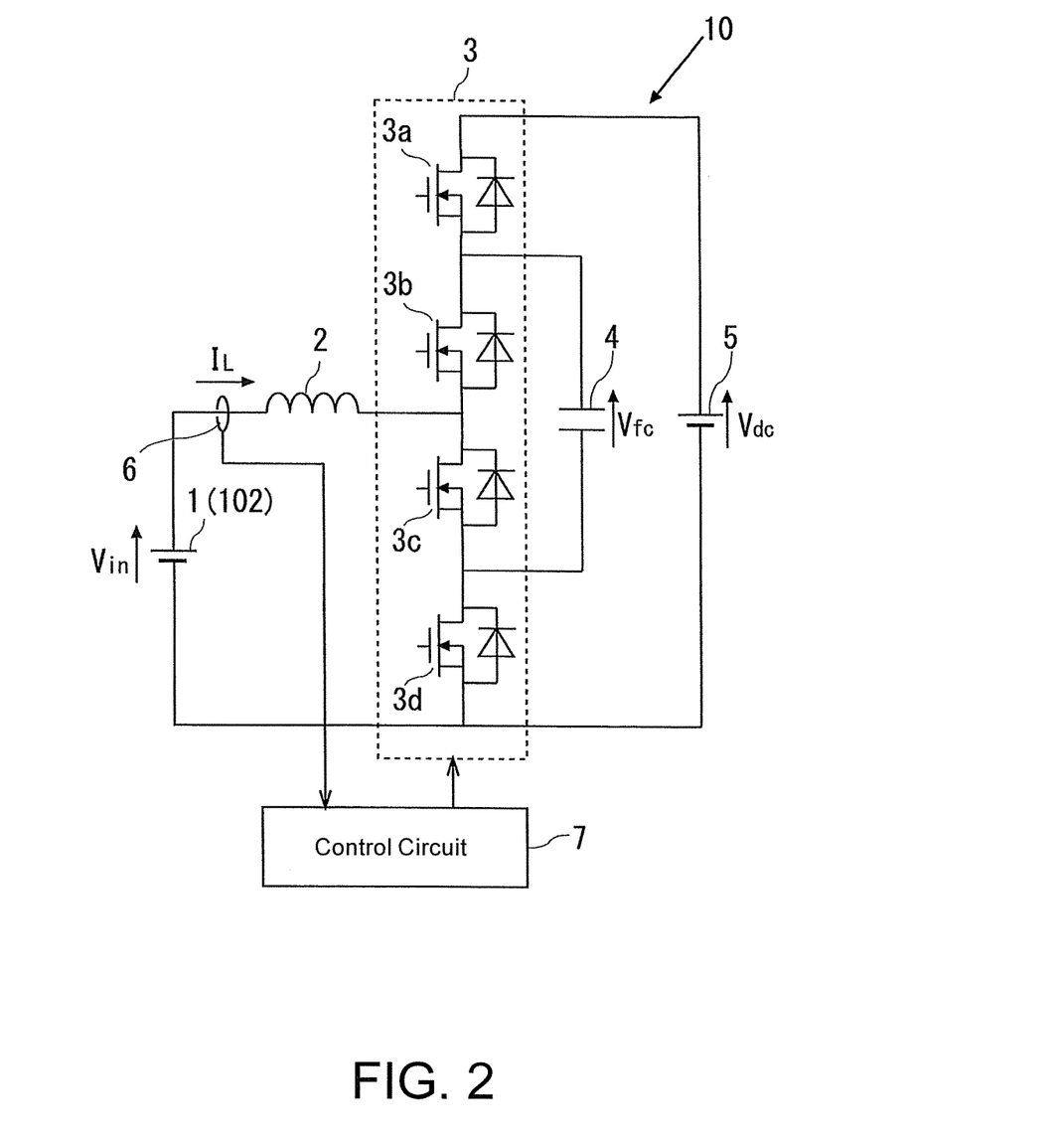
FIG. 2 is a circuit diagram of a flying capacitor type DC-DC converter according to the embodiment of the disclosure.

In this example of the application, a flying capacitor DC-DC converter (hereinafter also referred to as FCC (Flying Capacitor Converter)) as illustrated in FIG. 2 is adopted as the DC-DC converter 10. The FCC 10 will be described in detail.

A positive electrode and a negative electrode (not illustrated) of the power generation device 102 are respectively connected to a high voltage side terminal and a low voltage side terminal (not illustrated) of the input unit 1. Further, one terminal of a boosting reactor 2 is connected to the high voltage side terminal (the positive electrode) in the input unit 1. Both terminals of a switching circuit 3 are connected to an output unit 5. A first switching element 3a, a second switching element 3b, a third switching element 3c, and a fourth switching element 3d are connected in series in this order from a positive electrode side to a negative electrode side of the output unit 5. In each of the first to fourth switching elements 3a to 3d, a source of a MOSFET is connected to an anode of a diode, a drain of the MOSFET is connected to a cathode of the diode, and a gate signal is input to a gate of the MOSFET. The diode may be a parasitic diode of the MOSFET.

One terminal (the drain side of the MOSFET) of the first switching element 3a is connected to a positive electrode of the output unit 5. One terminal (the drain side of the MOSFET) of the second switching element 3b is connected to the other terminal (the source side of the MOSFET) of the first switching element 3a, one terminal (the drain side of the MOSFET) of the third switching element 3c is connected to the other terminal (the drain side of the MOSFET) of the second switching element 3b, and one terminal (the drain side of the MOSFET) of the fourth switching element 3d is connected to the other terminal (the source side of the MOSFET) of the third switching element 3c. The other terminal (the source side of the MOSFET) of the fourth switching element 3d is connected to a negative electrode of the output unit 5. The other terminal (the source side of the MOSFET) of the second switching element 3b and the one terminal (the drain side of the MOSFET) of the third switching element 3c are connected to the other terminal of the reactor 2.

A flying capacitor 4 is connected to a connection point between the first switching element 3a and the second switching element 3b and a connection point between the third switching element 3c and the fourth switching element 3d in the FCC 10. This flying capacitor 4 is a capacitor floating in a circuit of the FCC 10 and can hold a plurality of different voltages and obtain a multilevel output voltage for an output voltage Vdc in the output unit 5 through addition or subtraction of the voltages.

A control circuit 7 generates gate signals of the first switching element 3a to the fourth switching element 3d and outputs the gate signals to the first switching element 3a to the fourth switching element 3d so that the first switching element 3a and the fourth switching element 3d are alternately turned on or turned off and the second switching element 3b and the third switching element 3c are alternately turned on or turned off, thereby performing a voltage boosting operation. By controlling these switching elements, a voltage Vfc of the flying capacitor 4 is varied and the output voltage Vdc in the output unit 5 is controlled.

In this case, a reactor current $I_L$ detected by a current sensor 6 is input to the control circuit 7. The control circuit 7 turns on or turns off the first switching element 3a to the fourth switching element 3d on the basis of the detected reactor current $I_L$ so that a value of the reactor current $I_L$ shows a predetermined behavior. In this case, an on/off time of the first switching element 3a to the fourth switching element 3d is controlled so that a maximum value in the reactor current $I_L$ is smaller than a predetermined value. Through such control, it is made possible to use switching elements with a low current capacity rating as the first switching element 3a to the fourth switching element 3d.

It should be noted that the power generation device 102 in the above example of the application is not particularly limited to a solar cell. For example, the power generation device 102 may be a power generation device based on other principles such as a wind power generation device or a geothermal power generation device, or may be a battery device such as a storage battery. Further, in the above example of the embodiment, a MOSFET is exemplified as the switching element constituting the switching circuit 3. However, it is obvious that other switching elements can be used. For example, a bipolar transistor or an insulated gate bipolar transistor (IGBT) may be used.

<Embodiment 1 (Description of Principle)>

Next, an operation principle of the FCC 10 according to the disclosure will be described in detail. As a control scheme for the reactor current $I_L$ flowing through the reactor 2 in the FCC 10, there are a continuous current mode (hereinafter also referred to as a CCM) and a discontinuous current mode (hereinafter also referred to as a DCM), as described above. In Embodiment 1, the FCC 10 is driven in the discontinuous current mode (DCM).

Figure 3A:
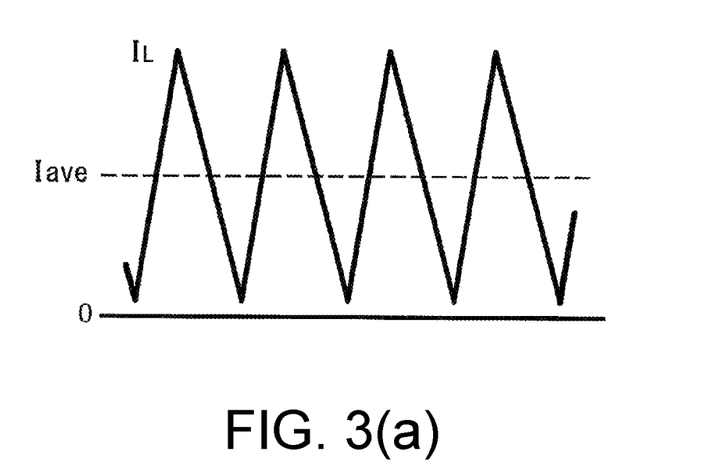
FIGS. 3(a)~3(b) are diagrams illustrating a current waveform in a continuous current mode.
Figure 3B:
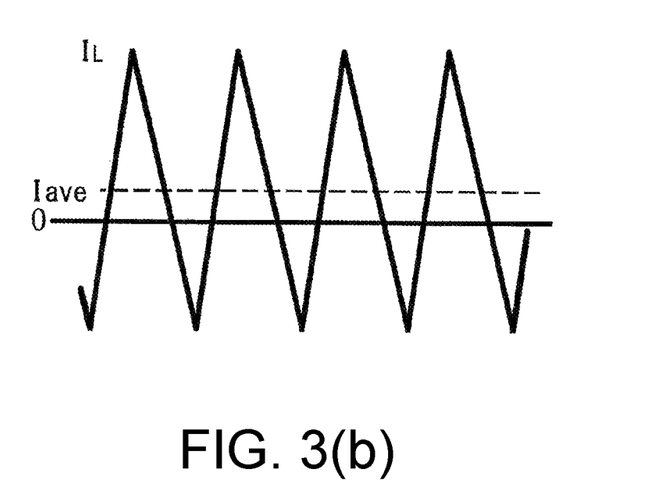

For simplicity, an operation of a general boosting chopper 50 illustrated in FIG. 11 will first be described herein. FIG. 3(*a*) and FIG. 3(*b*) illustrate a graph of change in reactor current $I_L$ in a CCM in the general boosting chopper 50. FIG. 3(*a*) is a graph for a heavy load, and FIG. 3(*b*) is a graph for a light load. In the case of the heavy load, an average value of the reactor current $I_L$ is relatively high and a current value is always positive, as illustrated in FIG. 3(*a*). In the case of the light load, the average value of the reactor current $I_L$ becomes relatively low, and the reactor current $I_L$ alternately becomes positive or negative as illustrated in FIG. 3(*b*). Thus, in the CCM, there is an advantage that a shape of a current waveform is constant and easy to control, but a peak value of the current waveform is large. Therefore, a switching element with a large current capacity is required, and there is a disadvantage that efficiency is degraded at the light load. It should be noted that, here, when the reactor current $I_L$ is positive, it indicates the case that the current flows through the reactor 2 from the input unit 1 to the switching circuit 3. When the reactor current $I_L$ is negative, it indicates the case that a current flows through the reactor 2 from the switching circuit 3 to the input unit 1.

Figure 4A:
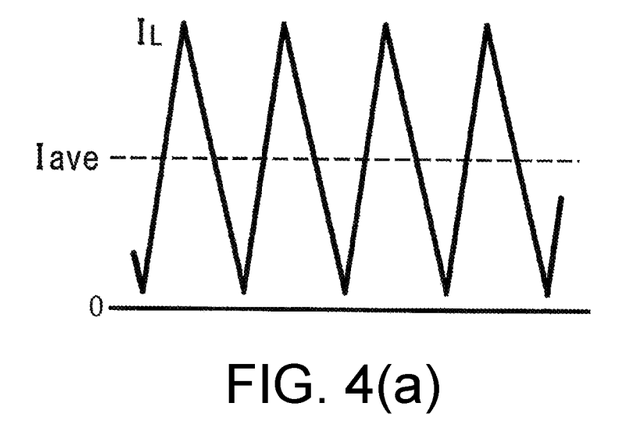
FIGS. 4(a)~4(c) are diagrams illustrating a current waveform in a discontinuous current mode.
Figure 4B:
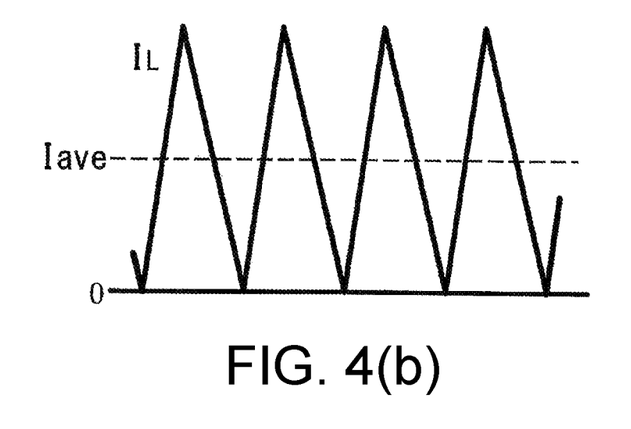
Figure 4C:
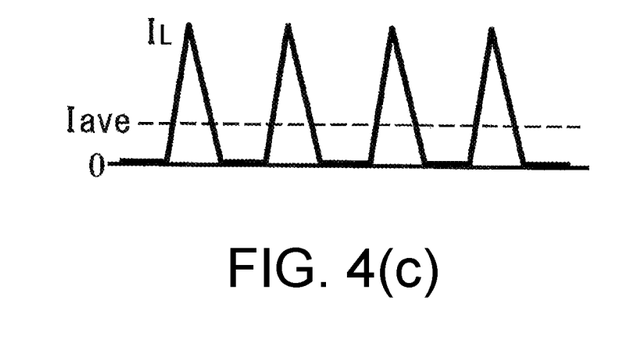
Figure 5A:
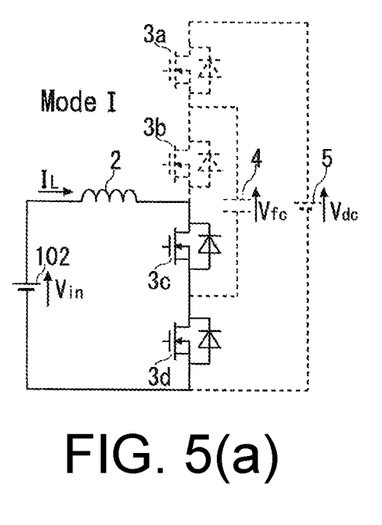
FIGS. 5(a)~5(d) are diagrams illustrating states of four modes during a switching period in an embodiment of the disclosure.
Figure 5B:
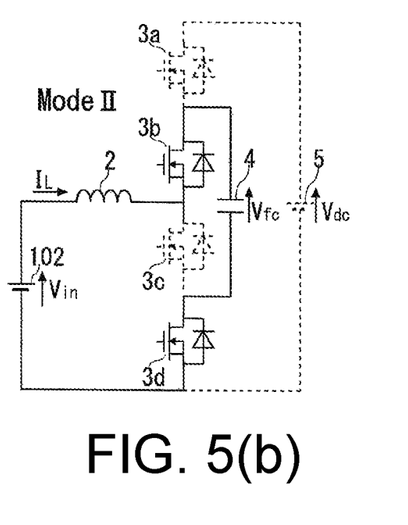
Figure 5C:
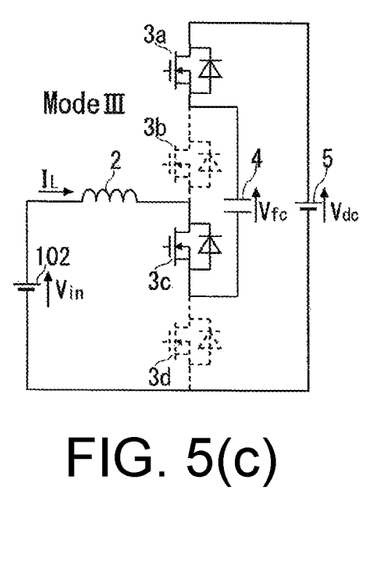
Figure 5D:
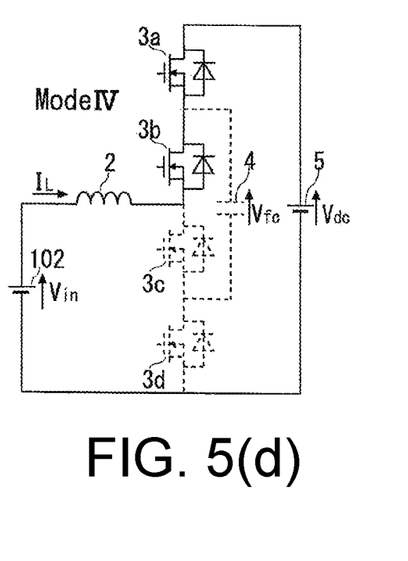

Next, the DCM will be described. FIG. 4(*a*) to FIG. 4(*c*) illustrate change in the reactor current $I_L$ when the DCM has been applied in the boosting chopper 50 illustrated in FIG. 11. A case in which a load is reduced from a heavy load is illustrated from FIG. 4(*a*) to FIG. 4(*c*). As illustrated in FIG. 4(*a*), at a heavy load, an average value of the reactor current $I_L$ is relatively high and the current always has a positive value, as in the case of the CCM. FIG. 4(*b*) illustrates a state in which the average value of the reactor current $I_L$ is somewhat smaller as compared with the case in FIG. 4(*a*), and a minimum value of the current becomes substantially zero. This state is called a critical mode, and a relationship of the average current value Iave=$I_L$/2 is maintained.

FIG. 4(*c*) illustrates a case of a light load in which the average value of the reactor current $I_L$ is smaller than that in a critical mode. In the DCM, at a light load, the average value of the reactor current $I_L$ decreases, but the current does not have a negative value. That is, the current value becomes zero during a period in which the current has a negative value in the CCM. As a result, the current value becomes discontinuous. An advantage of the DCM includes improved efficiency at the light load, but there is also a disadvantage that it is necessary to switch or compensate for a control method according to the current value, making control complicated. Further, in this case, since the peak value of the current waveform at the heavy load is equal to that in the case of the CCM, a disadvantage that a switching element with a large current capacity is required also remains.

On the other hand, in the embodiment, the DCM is applied to the FCC 10 illustrated in FIG. 2 and control for causing the waveform of the reactor current $I_L$ to have multiple levels (hereinafter also referred to as "multilevel control") is performed, such that the peak value of the current waveform is adjusted to be a lower value.

FIG. 5(*a*) to FIG. 5(*d*) illustrate an operation mode of the multilevel control in the embodiment. In the multilevel control, the reactor current $I_L$ flowing through the reactor 2 is controlled using four modes from Mode I to Mode IV, as respectively illustrated in FIG. 5(*a*) to FIG. 5(*d*). An ON/OFF pattern of the first switching element 3*a* to the fourth switching element 3*d* in Modes I to IV is shown in Table 1. It should be noted that Modes I to IV in this embodiment correspond to a first mode to a fourth mode.

TABLE 1

|  | Modes I | Modes II | Modes III | Modes IV |
|---|---|---|---|---|
| SW1 | OFF | OFF | ON | ON |
| SW2 | OFF | ON | OFF | ON |
| SW3 | ON | OFF | ON | OFF |
| SW4 | ON | ON | OFF | OFF |

It should be noted that in the embodiment, the mode is changed in the order of Mode I, Mode II, Mode III, and Mode IV in order to suppress the current peak value, as illustrated in FIG. 5(*a*) to FIG. 5(*d*) and Table 1. Further, in this case, it is necessary for the input voltage Vin, the output voltage Vdc, and the voltage Vfc of the flying capacitor 4 to satisfy Equations (1) and (2) below.

$$Vin \leq Vdc/2 \tag{1}$$

$$Vfc \leq Vin \tag{2}$$

Further, in order to ensure the continuity of a circuit operation in the multilevel control, a current-time product of a current flowing through the flying capacitor 4 must be zero in one switching period from Mode I to Mode IV. Therefore, it is necessary for a duty ratio to be set so that current-time products of the reactor current $I_L$ in Mode II and Mode III become equal.

Figure 6:
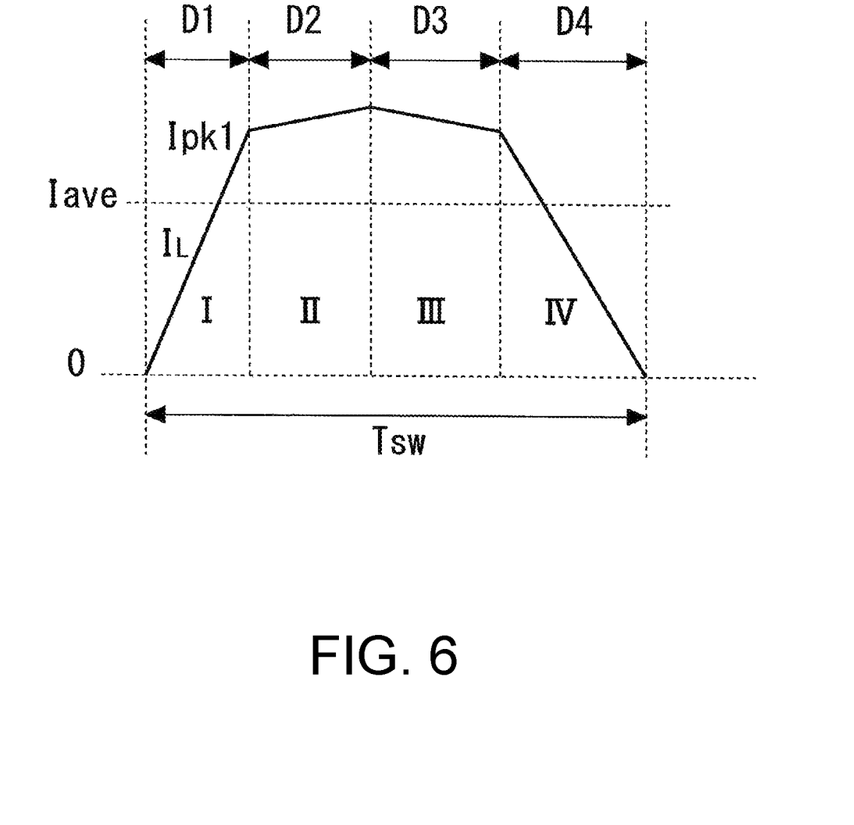
FIG. 6 is a graph showing a reactor current waveform during a switching period in an embodiment of the disclosure.

FIG. 6 illustrates an example of a waveform of the reactor current $I_L$ obtained through the multilevel control in the embodiment. In FIG. 6, control in a critical mode is assumed, and Tsw is a switching period including Modes I to IV. Further, D1 to D4 are duties of the respective modes. Further, Ipk1 is a maximum current value in Mode I.

Figure 7:
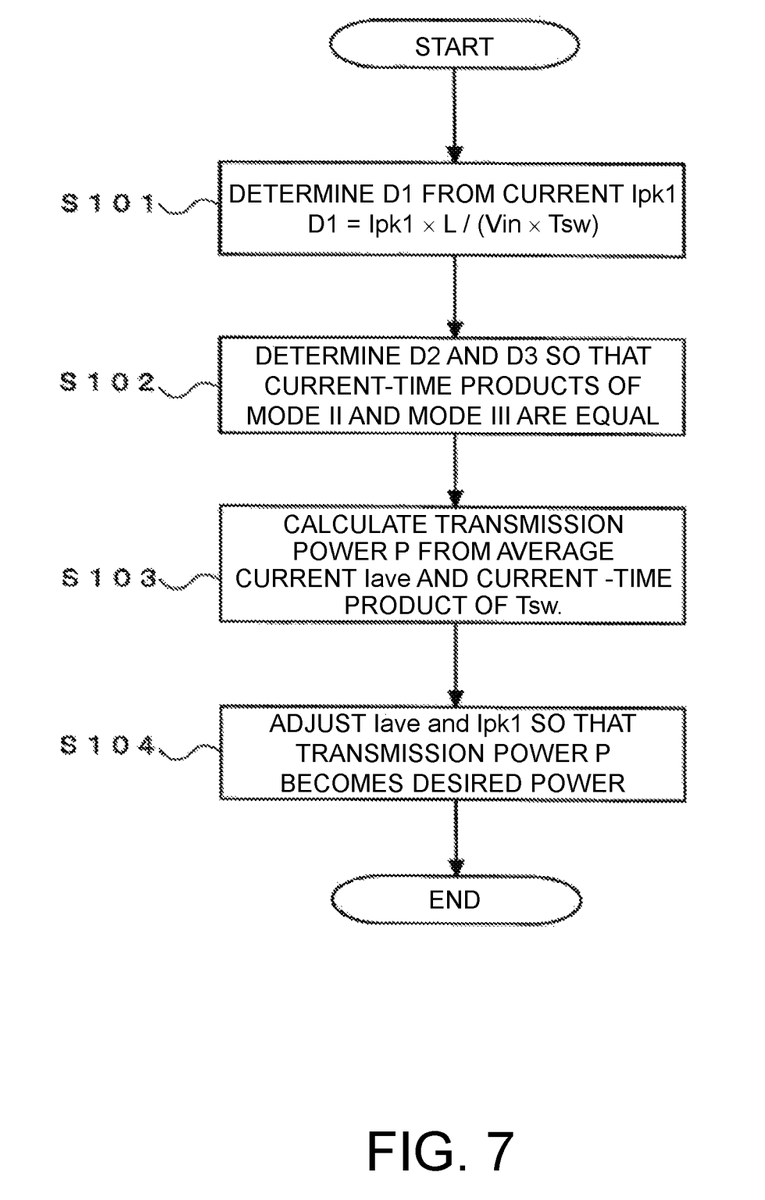
FIG. 7 is a flowchart of a waveform determination routine for determining a maximum current value and a duty ratio in Mode I during the switching period in the embodiment of the disclosure.

FIG. 7 illustrates a flowchart of a waveform determination routine when the current waveform of the multilevel control illustrated in FIG. 6 is determined. When this routine is executed, a value of D1 is first determined according to Equation (3) below in step S101.

$$D1 = Ipk1 \times L/(Vin \times Tsw) \tag{3}$$

Here, a value of the current Ipk1 is determined from a relationship with the current capacity of the switching element in advance, and a switching period Tsw is comprehensively determined using a transmission power, efficiency, circuit components (constants), and balance of a control response. It should be noted that it is possible to set the critical mode by appropriately selecting the period Tsw. When the process of step S101 ends, the process proceeds to step S102.

In step S102, values of D2 and D3 are determined so that values of the current-time products of Mode II and Mode III are equal to each other. When the process of step S102 ends, the process proceeds to step S103.

In step S103, a transmission power P is calculated from an average current value Iave and a switching period Tsw. When the process of step S103 ends, the process proceeds to step S104.

In step S104, Iave and Ipk1 are adjusted so that the transmission power P calculated in step S103 becomes a desired value.

Figure 8A:
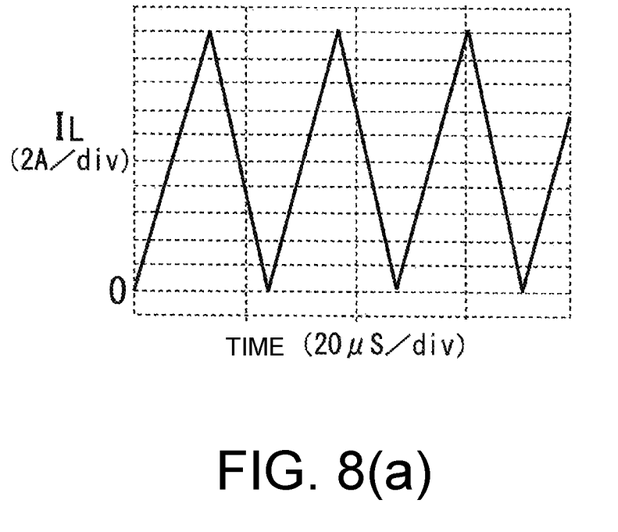
FIGS. 8(a)~8(b) respectively illustrate simulation results of a reactor current waveform in a boosting chopper circuit of the related art and a reactor current waveform in the flying capacitor type DC-DC converter according to the embodiment of the disclosure.
Figure 8B:
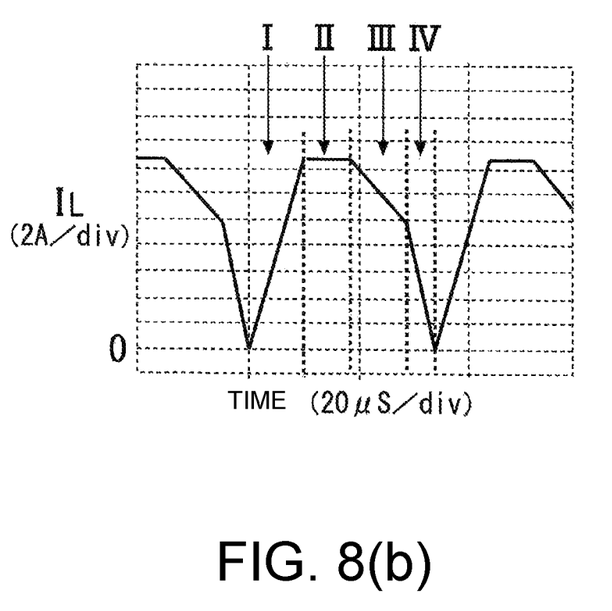

Next, FIGS. 8(*a*)~8(*h*) respectively illustrate simulation results of a reactor current waveform in a boosting chopper circuit of the related art and a reactor current waveform in the flying capacitor type DC-DC converter according to the embodiment of the disclosure. FIG. 8(*a*) illustrates a waveform of the reactor current IL in the critical mode of the boosting chopper 50 illustrated in FIG. 11, and a switching frequency fswBC=42.8 kHz. On the other hand, FIG. 8(*b*) illustrates a waveform of the reactor current IL in the critical mode of the FCC 10 illustrated in FIG. 2, and the switching frequency fswFCC=30 kHz. Further, in simulation waveforms of FIGS. 8(*a*) and 8(*b*), common conditions are a transmission power P=1.5 KW, Vdc=350 V, Vfc=Vin=150 V, and L=100 μH. As shown in FIG. 8(*a*) and FIG. 8(*b*), the "div" indicates the interval between the horizontal line and the vertical line shown by the dotted lines in FIGS. 8 (*a*) and 8 (*b*). The vertical axis shows 2 A at one interval and the horizontal axis shows 20 μs (microsecond) at one interval. In the case of the current IL (vertical axis), since the peak value is equal to 10 intervals, it is 20 A.

In the boosting chopper 50, the peak value of the current waveform is as large as about 20 A in the critical mode, as illustrated in FIG. 8(*a*). On the other hand, in the multilevel control of the FCC 10 illustrated in FIG. 8(*b*), the reactor current $I_L$ during one switching period is controlled to have a trapezoidal shape such that the peak value of the current waveform can be reduced to 15 A or less. It should be noted that, in the example illustrated in FIG. 8(b), the maximum value of the reactor current $I_L$ in Mode I is continued in Mode II. Thus, by suppressing the maximum value of the reactor current $I_L$ in Mode I, the peak value of the reactor current $I_L$ during one switching period can be suppressed more easily or reliably. Here, a slope A of the reactor current $I_L$ in Mode II is defined as A=(Vin−Vfc)/L (L is reactance of the reactor 2). Therefore, in Mode II, in order for the maximum value of the reactor current $I_L$ in Mode I to be continued (in order to make the slope of the current zero), a condition Vin=Vfc may be caused to be satisfied. It should be noted that, by causing the condition Vin<Vfc to be satisfied, the slope A of the reactor current $I_L$ in Mode II is made negative and the reactor current $I_L$ in Mode II is decreased, such that the maximum value of the reactor current $I_L$ in Mode I is made smaller.

Figure 9:
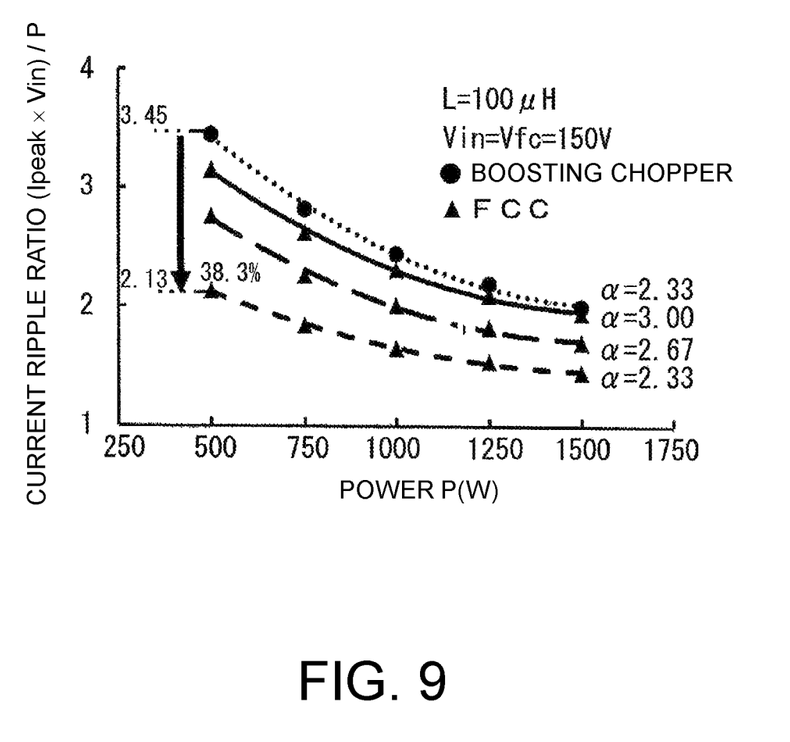
FIG. 9 is a graph showing a relationship between a reactor current waveform in the boosting chopper circuit of the related art and a transmission power and a ripple ratio of a reactor current waveform in the flying capacitor type DC-DC converter according to the embodiment of the disclosure.

FIG. 9 illustrates a comparison result of current peak values in the critical mode according to two circuit schemes. In FIG. 9, a horizontal axis indicates the transmission power P and a vertical axis indicates a current ripple ratio shown as (Ipeak×Vin)/P. It should be noted that here, Ipeak corresponds to a current value of a vertex in a triangular wave in FIG. 8(a). Further, in FIG. 8(b), Ipeak corresponds to a current value (=Ipk1) of a maximum point of the current in Mode I. It can be seen from FIG. 9 that, at the same transmission power P, the current ripple ratio increases and a ratio of the current peak Ipeak to the average current value Iave increases as a boosting ratio α increases.

This is due to the fact that when the boosting ratio α increases, the period D1 of Mode I which is a charging mode for the reactor increases and the current peak value increases. Further, it can be seen from a comparison between curves when the boosting ratio is α=2.33 in two circuit schemes in FIG. 9 that a difference in current peak value between the boosting chopper 50 and the FCC 10 tends to increase when the transmission power P decreases at the equal boosting ratio α. It was seen from FIG. 9 that when the transmission power P and the reactor in both of the circuit configurations are under the same conditions in a range of the boosting ratio α and the transmission power P at a current time, the current ripple ratio in the FCC 10 can be reduced by a maximum of 38.3%, as compared with the boosting chopper 50. Accordingly, it is possible to reduce the current capacity of the reactor 2 and each of the switching elements 3a to 3d of the switching circuit 3 as much as possible, and to greatly reduce a size or cost of the device.

Figure 10A:
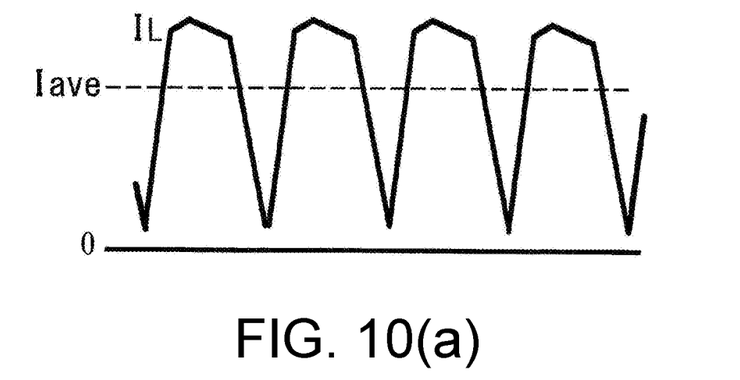
FIGS. 10(a)~10(c) are diagrams illustrating an example of reactor current waveforms at a heavy load, a critical mode, and a light load in the flying capacitor type DC-DC converter according to the embodiment of the disclosure.
Figure 10B:
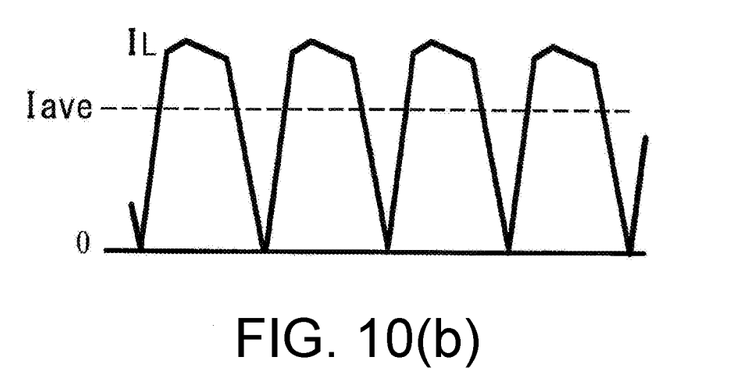
Figure 10C:
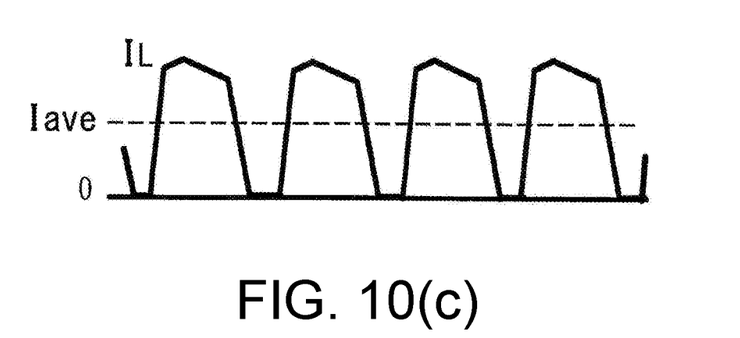

It should be noted that although the above simulation has been performed in the critical mode, the disclosure can also be applied at the heavy load or the light load other than the critical mode. FIGS. 10(a)~10(c) are diagrams illustrating an example of reactor current waveforms at a heavy load, a critical mode, and a light load in the flying capacitor type DC-DC converter according to the embodiment of the disclosure. FIG. 10(a) illustrates a current waveform in a case in which the control is applied at the heavy load, FIG. 10(b) illustrates a current waveform in a case in which the control is applied in the critical mode, and FIG. 10(c) illustrates a current waveform in a case in which the control is applied at the light load.

Even when the disclosure is applied at the heavy load or the light load, the switching frequency may be changed for the critical mode and then the multilevel control may be performed as long as the input voltage Vin and the output voltage Vdc do not change. By setting the waveform of the reactor current $I_L$ for the critical mode, it is possible to suppress the peak value of the reactor current $I_L$ as low as possible using a simple current control method.

The content described in the above embodiments is merely an example of the disclosure. In addition to the content illustrated in the above embodiment, it is obvious that the content of the embodiment can be appropriately changed without departing from the spirit of the disclosure. For example, although the peak value of the reactor current $I_L$ in Mode I is maintained in Mode II so that the current waveform has the trapezoidal shape in the multilevel control illustrated in FIG. 8(b), the current waveform in the multilevel control is not necessarily the trapezoidal shape. The value of the reactor current $I_L$ may be changed in Mode II, as illustrated in FIG. 6 or 10.

Further, for example, although the above embodiment is on the premise that the actual reactor current $I_L$ is detected by the current sensor 6, and feedback control is performed by the control circuit 7 so that a detected value becomes, for example, the value determined in the waveform determination routine of FIG. 7, the actual reactor current $I_L$ may not be detected by the current sensor 6 and the control circuit 7 may perform open control for the on/off of the respective switching elements 3a to 3d in the switching circuit 3 on the basis of a design value. Further, the reactor current $I_L$ may be controlled by performing feedback control using an average value Iave (=P/Vin) of the input current.

Further, although a configuration in which the DC-DC converter 10 includes the control circuit 7 has been adopted in the example of the application and the embodiment, a configuration in which the power conditioner 101 includes the control circuit 7, including the control circuit for a switching element in the inverter circuit 103, may be adopted.

It should be noted that, hereinafter, configuration requirements of the disclosure are described with reference signs in the drawings in order to make it possible to compare the configuration requirements of the disclosure with configurations of the embodiment.

The disclosure is a DC-DC converter that boosts a DC input voltage to obtain a DC output voltage, the DC-DC converter including: a switching circuit of which both terminals are connected to an output unit that outputs the DC output voltage and in which four switching elements are connected in series in an order of a first switching element, a second switching element, a third switching element, and a fourth switching element; a flying capacitor that is connected between a connection portion between the first switching element and the second switching element and a connection portion between the third switching element and the fourth switching element; a reactor that is connected between a connection portion between the second switching element and the third switching element and a positive electrode of an input unit to which the DC input voltage is input; and a control circuit that turns on/off each switching element in the switching circuit at a predetermined timing, wherein the control circuit turns on/off each of the switching elements so that a maximum value in a reactor current flowing through the reactor becomes equal to or smaller than a predetermined value.

Here, since the DC-DC converter according to the disclosure includes the flying capacitor, a maximum value of the reactor current in one switching period can be controlled by appropriately adjusting an on/off timing of each switching element in the switching circuit. In the disclosure, the control circuit turns on/off each of the switching elements so that the maximum value of the reactor current becomes equal to or smaller than the predetermined value. Therefore, according to the disclosure, it is possible to suppress an excessive current flowing through each element (including the reactor or the switching elements constituting the switching circuit) constituting the DC-DC converter, and to select an element with a small current capacity. As a result, it is possible to reduce a size or cost of a device, and to improve reliability of the device.

Further, in the disclosure, the DC-DC converter may include a first mode in which the first switching element and the second switching element in the switching circuit are turned off and the third switching element and the fourth switching element are turned on, a second mode in which the first switching element and the third switching element are turned off and the second switching element and the fourth switching element are turned on, a third mode in which the second switching element and the fourth switching element are turned off and the first switching element and the third switching element are turned on, and a fourth mode in which the third switching element and the fourth switching element are turned off and the first switching element and the second switching element are turned on, wherein the control circuit may determine a period of the first mode so that a maximum value of the reactor current in the first mode is smaller than a current according to a current capacity of each of the switching elements in the switching circuit.

Here, the first mode in the disclosure is a charging mode for the reactor, and the maximum value of the reactor current in the first mode is proportional to a duty ratio of the first mode in the switching period. Therefore, when the period of the first mode is determined so that the maximum value of the reactor current in the first mode is smaller than a current related to a current capacity of the switching element, it is more reliably possible to use an element with a smaller current capacity as the reactor or each switching element of the switching circuit, and to reduce a size or cost of the device.

Further, in the disclosure, periods of the second mode and the third mode may be determined so that current-time products of the reactor currents in the second mode and the third mode are equal.

Here, the second mode in the disclosure is a charging mode for the flying capacitor, and the third mode is a discharging mode for the flying capacitor. Therefore, when the current-time products of the reactor currents in the second mode and the third mode are made equal, it is possible to make a current-time product of the current flowing in the flying capacitor zero in one switching period. As a result, in the DC-DC converter of the disclosure, even when driving in the first mode to the fourth mode is repeated, it is possible to maintain the amount of charging of the flying capacitor in a certain range and to ensure the continuity of control.

Further, in the disclosure, the maximum value of the reactor current in the first mode may be continued as the value of the reactor current in the second mode. Thus, in the second mode, the value of the reactor current does not change from a value at the time of ending of the first mode (the maximum value in the first mode). Therefore, by setting the maximum value of the reactor current in the first mode to be smaller than the current related to the current capacity of each switching element in the switching circuit, the maximum value of the reactor current in one switching period can be more reliably set to be smaller than the current related to the current capacity of the reactor or each switching element in the switching circuit. As a result, it becomes possible to more reliably use an element with a smaller current capacity as each switching element in the switching circuit, and to reduce a size or cost of the device.

Further, in the disclosure, a discontinuous current mode in which the reactor current is zero may be applied when the reactor current flows from the switching circuit to the input unit. Thus, it is possible to improve efficiency, particularly, at the low load.

Further, the disclosure may be a power conditioner including: the DC-DC converter; and an inverter circuit that converts an output of the DC-DC converter to an AC.

It should be noted that in the disclosure, means for solving the above problem can be used in combination in a possible range.

According to the disclosure, it is possible to use a reactor or a switching element with a small current capacity in the DC-DC converter, and to reduce a size or cost of the device.

<Configuration 1>

A DC-DC converter (10) that boosts a DC input voltage to obtain a DC output voltage, the DC-DC converter including a switching circuit (3) of which both terminals are connected to an output unit (5) that outputs the DC output voltage, and in which four switching elements are connected in series in an order of a first switching element (3a), a second switching element (3b), a third switching element (3c), and a fourth switching element (3d); a flying capacitor (4) that is connected between a connection portion between the first switching element (3a) and the second switching element (3b) and a connection portion between the third switching element (3c) and the fourth switching element (3d); a reactor (2) that is connected between a connection portion between the second switching element (3b) and the third switching element (3c) and a positive electrode of an input unit (1) to which the DC input voltage is input; and a control circuit (7) that turns on/off each switching element in the switching circuit at a predetermined timing, wherein the control circuit (7) turns on/off each of the switching elements (3a to 3d) so that a maximum value in a reactor current flowing through the reactor becomes equal to or smaller than a predetermined value.

<Configuration 2>

The DC-DC converter according to Configuration 1 includes a first mode in which the first switching element (3a) and the second switching element (3b) in the switching circuit (3) are turned off and the third switching element (3c) and the fourth switching element (3d) are turned on, a second mode in which the first switching element (3a) and the third switching element (3c) are turned off and the second switching element (3b) and the fourth switching element (3d) are turned on, a third mode in which the second switching element (3b) and the fourth switching element (3d) are turned off and the first switching element (3a) and the third switching element (3c) are turned on, and a fourth mode in which the third switching element (3c) and the fourth switching element (3d) are turned off and the first switching element (3a) and the second switching element (3b) are turned on, wherein the control circuit (7) determines a period of the first mode so that a maximum value of the reactor current in the first mode is smaller than a current according to a current capacity of each of the switching elements (3a to 3d) in the switching circuit (3).

<Configuration 3>

The DC-DC converter according to Configuration 2, wherein periods of the second mode and the third mode are determined so that current-time products of the reactor currents in the second mode and the third mode are equal.

<Configuration 4>

The DC-DC converter according to Configuration 2 or 3, wherein the maximum value of the reactor current in the first mode is continued as the value of the reactor current in the second mode.

<Configuration 5>

The DC-DC converter according to any one of Configurations 1 to 4, wherein a discontinuous current mode in which the reactor current is zero is applied when the reactor current flows from the switching circuit to the input unit.

<Configuration 6>

A power conditioner including the DC-DC converter according to any one of Configurations 1 to 5; and an inverter circuit that converts an output of the DC-DC converter to an AC.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A DC-DC converter that boosts a DC input voltage to obtain a DC output voltage, the DC-DC converter comprising:
    a switching circuit of which both terminals are connected to an output unit that outputs the DC output voltage and in which four switching elements are connected in series in an order of a first switching element, a second switching element, a third switching element, and a fourth switching element;
    a flying capacitor that is connected between a connection portion between the first switching element and the second switching element and a connection portion between the third switching element and the fourth switching element;
    a reactor that is connected between a connection portion between the second switching element and the third switching element and a positive electrode of an input unit to which the DC input voltage is input; and
    a control circuit that determines a period of a first mode according to a predetermined timing and current peak value, and turns on or turns off each switching element in the switching circuit at the predetermined timing,
    wherein the control circuit turns on or turns off each of the switching elements based on the period of the first mode so that a maximum value in a reactor current flowing through the reactor becomes equal to or smaller than a predetermined value.

2. The DC-DC converter according to claim 1, wherein a discontinuous current mode in which the reactor current is zero is applied when the reactor current flows from the switching circuit to the input unit.

3. The DC-DC converter according to claim 1, wherein the first mode in which the first switching element and the second switching element in the switching circuit are turned off and the third switching element and the fourth switching element are turned on, a second mode in which the first switching element and the third switching element are turned off and the second switching element and the fourth switching element are turned on, a third mode in which the second switching element and the fourth switching element are turned off and the first switching element and the third switching element are turned on, and a fourth mode in which the third switching element and the fourth switching element are turned off and the first switching element and the second switching element are turned on,
    wherein the control circuit determines the period of the first mode so that a maximum value of the reactor current in the first mode is smaller than a current according to a current capacity of each of the switching elements in the switching circuit.

4. The DC-DC converter according to claim 3, wherein the maximum value of the reactor current in the first mode is continued as a value of the reactor current in the second mode.

5. The DC-DC converter according to claim 4, wherein a discontinuous current mode in which the reactor current is zero is applied when the reactor current flows from the switching circuit to the input unit.

6. The DC-DC converter according to claim 3, wherein a discontinuous current mode in which the reactor current is zero is applied when the reactor current flows from the switching circuit to the input unit.

7. The DC-DC converter according to claim 3, wherein periods of the second mode and the third mode are determined so that current-time products of the reactor currents in the second mode and the third mode are equal.

8. The DC-DC converter according to claim 7, wherein a discontinuous current mode in which the reactor current is zero is applied when the reactor current flows from the switching circuit to the input unit.

9. The DC-DC converter according to claim 7, wherein the maximum value of the reactor current in the first mode is continued as a value of the reactor current in the second mode.

10. The DC-DC converter according to claim 9, wherein a discontinuous current mode in which the reactor current is zero is applied when the reactor current flows from the switching circuit to the input unit.

11. A power conditioner comprising:
    the DC-DC converter according to claim 1; and
    an inverter circuit that converts an output of the DC-DC converter to an AC.

12. A power conditioner comprising:
    the DC-DC converter according to claim 2; and
    an inverter circuit that converts an output of the DC-DC converter to an AC.

13. A power conditioner comprising:
    the DC-DC converter according to claim 3; and
    an inverter circuit that converts an output of the DC-DC converter to an AC.

14. A power conditioner comprising:
    the DC-DC converter according to claim 7; and
    an inverter circuit that converts an output of the DC-DC converter to an AC.

15. A power conditioner comprising:
    the DC-DC converter according to claim 9; and
    an inverter circuit that converts an output of the DC-DC converter to an AC.

* * * * *